United States Patent
Krause et al.

(10) Patent No.: US 7,255,815 B2
(45) Date of Patent: *Aug. 14, 2007

(54) TITANIUM DIOXIDE SCOURING MEDIA AND METHOD OF PRODUCTION

(75) Inventors: Claude Krause, St. Martinsville, LA (US); Steve Canova, Gray, GA (US)

(73) Assignee: Carbo Ceramics Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/396,279

(22) Filed: Mar. 24, 2003

(65) Prior Publication Data

US 2004/0187392 A1    Sep. 30, 2004

(51) Int. Cl.
*C04B 35/49* (2006.01)
*C09C 1/36* (2006.01)

(52) U.S. Cl. .......................... 264/15; 501/134
(58) Field of Classification Search ............ 106/428, 106/430, 436; 264/15; 23/313; 510/445–446, 510/508; 501/80, 94; 51/308; 423/610
See application file for complete search history.

(56) References Cited

U.S. PATENT DOCUMENTS

| | | | |
|---|---|---|---|
| 1,567,445 A | | 12/1925 | Lubowsky |
| 2,721,626 A | | 10/1955 | Rick |
| 4,061,596 A | * | 12/1977 | Matsushita et al. ......... 502/439 |
| 4,113,660 A | * | 9/1978 | Abe et al. .................. 502/84 |
| 4,166,147 A | * | 8/1979 | Lange et al. ................ 428/328 |
| 4,293,445 A | * | 10/1981 | Shimizu et al. ............. 502/200 |
| 4,321,224 A | * | 3/1982 | Shimizu et al. ............. 264/115 |
| 4,427,068 A | * | 1/1984 | Fitzgibbon ............... 166/280.2 |
| 4,784,841 A | | 11/1988 | Hartmann et al. |
| 5,510,068 A | | 4/1996 | Parmentier |
| 6,036,999 A | * | 3/2000 | Zhao et al. ................ 427/215 |
| 6,149,712 A | | 11/2000 | Hall et al. |
| 6,660,243 B1 | * | 12/2003 | Proft et al. ................ 423/610 |
| 2004/0187392 A1 | | 9/2004 | Krause et al. |

FOREIGN PATENT DOCUMENTS

WO    WO 2004/085490 A2    10/2004

OTHER PUBLICATIONS

Communication from the U.S. International Searching Authority, dated Mar. 16, 2005 regarding International Application No. PCT/US2004/008959, which corresponds to U.S. Appl. No. 10/396,279.
Communication from the International Preliminary Examining Authority, dated May 25, 2005 regarding International Application No. PCT/US2004/008959, which corresponds to U.S. Appl. No. 10/396,279.
"TiO$_2$ Times," a publication of Kerr-McGee Chemical LLC, Summer/Fall 2001.
International Search Report from the U.S. International Searching Authority, dated Nov. 30, 2005 regarding International Application No. PCT/US05/15005, which corresponds to U.S. Appl. No. 10/837,433.
Written Opinion from the U.S. International Searching Authority, dated Nov. 30, 2005 regarding International Application No. PCT/US05/15005, which corresponds to U.S. Appl. No. 10/837,433.
Communication from the U.S. Patent and Trademark Office, dated Aug. 24, 2005, regarding U.S. Appl. No. 10/396,298.
Communication from the U.S. Patent and Trademark Office, dated Mar. 24, 2005, regarding U.S. Appl. No. 10/396,298.
Communication from the U.S. Patent and Trademark Office, dated Mar. 24, 2005, regarding U.S. Appl. No. 10/837,433.
Communication from the U.S. Patent and Trademark Office, dated Sep. 7, 2005, regarding U.S. Appl. No. 10/837,433.
Communication from the U.S. International Searching Authority, dated Oct. 19, 2004, regarding International Application No. PCT/US2004/008959, which corresponds to U.S. Appl. No. 10/396,279.

* cited by examiner

*Primary Examiner*—C. Melissa Koslow
(74) *Attorney, Agent, or Firm*—Haynes and Boone, LLP; Randall C. Brown

(57) ABSTRACT

The present invention relates to a round and spherical titanium dioxide scouring media and a method for producing the media. The scouring media is effective in removing titanium dioxide buildup on the walls of a titanium dioxide reaction vessel. The method consists of forming green titanium dioxide pellets in a high intensity mixer by mixing commercially available titanium dioxide dust and water. The high intensity mixer produces substantially round and spherical green pellets which are subsequently sized and sintered in a kiln to form round and spherical titanium dioxide sintered pellets that are suitable as a scouring media. The high intensity mixer allows the operator to closely control the size and shape of the pellets during the forming process to produce substantially round and spherical green pellets. Because the sintered titanium dioxide pellets are substantially round and spherical in shape, they are much less abrasive to the walls of the reaction vessel. Furthermore, as the pellets themselves abrade away, they do not contaminate the titanium dioxide product, and they can even be reprocessed into round and spherical scouring media.

8 Claims, No Drawings

TITANIUM DIOXIDE SCOURING MEDIA AND METHOD OF PRODUCTION

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to a titanium dioxide scouring media. Generally, the invention relates to substantially round and spherical sintered titanium dioxide pellets, and the method used involves pelletizing titanium dioxide dust and sintering the green pellet to form the scouring media.

2. Description of the Related Art

The production of titanium dioxide through the vapor phase oxidation of titanium tetrachloride has become a commonly used process in the production of titanium dioxide pigment. During this process, titanium tetrachloride vapors react with oxygen or air or both at high temperatures in an oxidation reactor. The resultant stream of hot oxidation products exiting the reactor contains titanium dioxide in a finely distributed form suspended in gaseous constituents. The freshly formed titanium dioxide particles, which are present at first as very reactive particles, grow together to form small aggregates of sizes below 0.15 mm. Some of these small aggregates grow larger in size and partly sinter to form larger, hard and unshapely aggregates above 0.15 mm in size. These larger aggregates tend to form in a layer and deposit on the surfaces of the hot reaction zone of the oxidation reactor. Continued use of the oxidation reactor and the hot reaction products which pass over it constantly regenerate this layer. Not only does this layer regenerate with continued use of the reactor, but often pieces of this layer break off and are carried away in the reaction mixture. These large particles are not suitable for pigment production and serve to contaminate the reaction mixture. Different processes have attempted to reduce the formation of these unwanted particles but none have been completely successful.

To prevent the formation of this layer of titanium dioxide particles, scouring media consisting of chemically inert scrubbing solids have been added to the reaction mixture at appropriate locations. Numerous substances have been used as scouring media to include aluminum oxide, zirconium silicate, and silica sand. One of the most commonly used scouring media is silica sand. However, there are disadvantages to the use of silica sand as a scouring media in an oxidation reactor.

Silica sand is somewhat angular in shape. This angular shape is effective in scouring the walls of the reactor, but it also severely wears the inner walls of the reactor. Eventually, the silica sand generates holes in the reactor which require repairs or in some cases replacement. The replacement time could be a matter of weeks, thus severely hampering production. Furthermore, these silica sand particles crush easily. The crushed silica sand contaminates the reactor mixture and must be removed from the mixture. If not removed, the silica sand will reduce the quality of the resultant product. Therefore, there exists a need for a scouring media that will be strong and dense enough to effectively scour the titanium dioxide reactor walls but is round and spherical and less abrasive to reduce or eliminate reactor wear. There is also a need for a scouring media that is sized properly to provide adequate separation and recycle and would reduce the potential for contamination of the reactor mixture.

Titanium dioxide has been used as a scouring media to address the disadvantages to using commonly known scouring media. However, the titanium dioxide previously produced for use as scouring media has not eliminated all of the problems associated with other scouring media. In the process described in U.S. Pat. No. 4,784,841, titanium dioxide scouring particles are produced by vapor phase oxidation of titanium tetrachloride. The particle aggregates initially formed which are above 0.15 mm are separated, admixed with alkaline hydroxides, calcined and returned to the process. This process produces particle aggregates of sizes between 0.2 to 2.0 mm for use as scouring aggregates for the prevention of deposit formation on the heat exchanger. This process fails to control the sizes and shape of the aggregates formed, thus failing to reduce the possibility of damage to the reactor walls and failing to maximize separation and recycle/reuse efficiency.

In the process described in U.S. Pat. No. 2,721,626, course scouring solids of sizes between 0.15 and 6.35 mm are admixed with a hot reaction mixture and after cooling separated from the reaction products and used again as scouring solids. The dry separation of the course scouring titanium dioxide particles from the finely particulated titanium dioxide is inefficient. Thus, there is always a percentage of course scouring solids in with the final product thereby reducing the overall efficiency of the process.

SUMMARY OF THE INVENTION

A primary object of the present invention is to produce a substantially round and spherical titanium dioxide scouring media through a process in which the size, strength, density and shape of the titanium dioxide particles are controlled and which would produce scouring media that would reduce or eliminate the problems of reactor wear and contamination of the reactor mixture during the titanium dioxide pigment manufacturing process.

In accordance with the invention, substantially round and spherical pellets comprised primarily of titanium dioxide for use as scouring media are produced. The pellets are initially formed by adding a sufficient amount of water to titanium dioxide dust in a high intensity mixer. The high intensity mixer creates substantially round and spherical green pellets which are subsequently sintered to form the final product.

BRIEF DESCRIPTION OF THE DRAWINGS

Not applicable.

DETAILED DESCRIPTION OF INVENTION

The method of this invention produces a titanium dioxide scouring media in which the size and shape of the titanium dioxide pellets are controlled to produce substantially round and spherical sintered particles. The density and strength are controlled through the sintering process and can be adjusted as required. Titanium dioxide pellets produced by this invention are substantially round and spherical in shape and reduce or eliminate the problems of reactor wear and contamination of the reactor mixture during the titanium dioxide pigment manufacturing process. For the purposes of this invention, pellets are substantially round and spherical if they measure about 0.8 or greater on the Krumbein/Sloss Roundness and Sphericity Chart.

In accordance with the invention, substantially round and spherical pellets comprised primarily of titanium dioxide are produced for use as a scouring media. The pellets are produced by mixing a sufficient amount of water to a sufficient amount of titanium dioxide dust in a high intensity mixer. Titanium dioxide dust is commercially available from a variety of manufacturers.

It is preferred that the mixture include a small amount of a binding agent to help hold the pellets together during the pelletizing phase. This binding agent can be added at any stage prior to pelletizing, but is preferably added at the grinding stage to ensure intimate mixture with the titanium dioxide dust. The preferred binding agents are organic in nature, such as PVA or starch, which allows the binding agent to burn off during the sintering phase. Starch is the especially preferred binding agent, and the amount that is added is about 0.5% on a dry weight basis.

Preferably, the titanium dioxide dust contains at least about 90% titanium dioxide, more preferably at least about 95% titanium dioxide, most preferably at least about 98% titanium dioxide. Obviously, the amount of water used depends on the amount of titanium dioxide used and will vary depending on the size of the mixer and the size of the charge. By way of example, a 250 pound charge of titanium dioxide dust will generally require about 7.0 gallons of water to form the green pellets.

Preferably, the titanium dioxide dust/water mixture is mixed in a high intensity mixer with a rotatable table provided with a rotatable impacting impeller, such as an Eirich or Lancaster mixer. After a sufficient amount of time in the mixer, spherical green pellets are formed. Typically, after such pellets have been formed, they are dried to provide sufficient green strength for screening. Normally, the drying temperature ranges from about 150° F. to about 250° F., with the preferred temperature being about 200° F. The dried pellets are screened to remove the undersized and oversized pellets. The dried pellets having the desired size, preferably about −8/+25 mesh, are sent to a rotary kiln for sintering at temperatures ranging from about 550° to about 1050° C., preferably about 850° C. or to a density of about 1.63 g/cc. The sintered pellets are screened to a desired size of about −10/+mesh. The pelletizing process for making the titanium dioxide pellets is quite similar to a process for making ceramic proppants which is described in U.S. Pat. No. 4,427,068 to Fitzgibbon which is incorporated herein by reference.

The resulting titanium dioxide pellets have a substantially round and spherical shape and a bulk density of about 1.38 g/cc to about 2.46 g/cc and exhibit a crush of less than about 40% at 4000 p.s.i., as measured by the American Petroleum Institute crush test for proppant. The strength, density, size and shape of the pellets formed help solve the problems evident in the prior art relating to reactor wear and contamination of the reactor mixture during the titanium dioxide pigment manufacturing process.

As sintering temperatures approach 550° C. more pellet breakdown will occur during scouring, producing higher consumption of the scour media. Lower sintering pellets lower tube wear at the sacrifice of scour efficiency. As sintering temperatures approach 1050° C. the harder more dense pellets enhance scour efficiency but at the sacrifice of reactor tube wear.

In the process of scouring the reactor tubes, the titanium dioxide scouring media wears away through attrition of the particles upon impact with the tube walls. Some of the scouring media will be fine enough to pass through the system and be included in the salable titanium dioxide product. Some of the attrited material will be course enough to be recycled as scouring media. However, some of the material will be too course for sale and too fine for use as a scouring media. One significant advantage of this product is that this intermediate sized material can be reprocessed into round and spherical scouring media, thereby eliminating waste and disposal problems. The reprocessing is accomplished by grinding the attrited titanium dioxide to a fine powder, preferably to about 80% −44 micron particle size, and re-pelletizing it in the same manner as with fresh titanium dioxide. The ground titanium dioxide can be reprocessed by itself or mixed with fresh titanium dioxide dust.

It will be obvious to those skilled in the art that the invention described herein can be essentially duplicated by making minor changes in the material content or the method of manufacture. To the extent that such material or methods are substantially equivalent, it is intended that they be encompassed by the following claims.

We claim:

1. A method for producing sintered titanium dioxide pellets comprising:
   (a) mixing water and titanium dioxide dust in a high intensity mixer to form the titanium dioxide dust directly into substantially round and spherical green pellets;
   (b) drying the titanium dioxide green pellets; and
   (c) sintering the dried titanium dioxide pellets at 850° C. to about 1050° C.;
   wherein the sintered titanium dioxide pellets have a substantially round and spherical shape that measures at least about 0.8 on the Krumbein/Sloss Roundness and Sphericity Chart.

2. The method according to claim 1 further comprising mixing a binder with the water and titanium dioxide dust.

3. The method according to claim 1 further comprising screening the substantially round and spherical green pellets prior to sintering.

4. The method according to claim 1 further comprising screening the sintered pellets.

5. The method of claim 1 wherein the titanium dioxide dust comprises at least about 90% titanium dioxide.

6. The method of claim 2 wherein the binder is selected from polyvinyl alcohol and starch.

7. The method of claim 1 wherein the sintered pellets have a bulk density from between about 1.38 g/cc to about 2.46 g/cc.

8. The method of claim 1 wherein the sintered pellets have a bulk density from between about 1.63 g/cc to about 2.46 g/cc.

* * * * *

UNITED STATES PATENT AND TRADEMARK OFFICE
CERTIFICATE OF CORRECTION

PATENT NO. : 7,255,815 B2 Page 1 of 1
APPLICATION NO. : 10/396279
DATED : August 14, 2007
INVENTOR(S) : Krause et al.

It is certified that error appears in the above-identified patent and that said Letters Patent is hereby corrected as shown below:

Column 3, line 45, change "-10/+mesh" to -- -10/+30 mesh --.

Signed and Sealed this

Fifteenth Day of April, 2008

JON W. DUDAS
*Director of the United States Patent and Trademark Office*